United States Patent
Snyder

[11] 3,878,863
[45] Apr. 22, 1975

[54] PILOT VALVE SYSTEM

[75] Inventor: David E. Snyder, Dallas, Tex.

[73] Assignee: Otis Engineering Corporation, Dallas, Tex.

[22] Filed: May 7, 1973

[21] Appl. No.: 357,855

[52] U.S. Cl. ............... 137/553; 137/82; 137/458; 137/557; 251/12
[51] Int. Cl... F16k 37/00; G05d 16/00; F16k 31/12
[58] Field of Search ............ 137/82, 553, 557, 458; 236/47, 86, 996; 251/12, 61

[56] References Cited
UNITED STATES PATENTS

| | | | |
|---|---|---|---|
| 607,491 | 7/1898 | Swenson | 137/505.13 X |
| 1,950,989 | 3/1934 | Mason | 236/86 X |
| 2,283,296 | 5/1942 | Temple | 137/82 |
| 2,477,835 | 8/1949 | Smith | 137/82 UX |
| 2,529,254 | 11/1950 | Ives | 137/82 |
| 2,601,377 | 6/1952 | Ellis | 236/86 X |

Primary Examiner—Alan Cohan
Assistant Examiner—Gerald A. Michalsky
Attorney, Agent, or Firm—H. Mathews Garland

[57] ABSTRACT

A pilot valve for sensing a first fluid pressure such as a well flow line and controlling a second fluid pressure of a system such as a well safety valve in response to a change in the first pressure. The pilot valve includes a bourdon tube coupled with a bleed valve which is activated in response to predetermined high and low values of the first pressure sensed by the bourdon tube. The bleed valve is connectable to the first pressure, such as a control pressure of a safety valve, for exhausting the control pressure for closing the safety valve in response to either the high or low predetermined pressure sensed by the bourdon tube. The bourdon tube is also connected with indicator means which show whether the pilot valve system operated in response to a high or a low sensed pressure. The pilot valve additionally includes means for indicating which of several such pilot valves was activated first where a plurality of such valves are interconnected in a fluid system.

12 Claims, 9 Drawing Figures

PILOT VALVE SYSTEM

This invention relates to valves and more particularly to a pilot valve for controlling a fluid system in response to a sensed pressure.

It is an object of this invention to provide a new and improved pilot valve.

It is another object of this invention to provide a pilot valve which responds to both high and low predetermined sensed pressures.

It is another object of this invention to provide a pilot valve which is actuated by a bourdon tube communicating with a sensed pressure.

It is another object of the invention to provide a pilot valve which exhausts one fluid pressure in response to another sensed pressure.

It is another object of the invention to provide a pilot valve which has an indicator for showing the value of the pressure which activated the valve.

It is another object of invention to provide a pilot valve which functions to a higher degree of accuracy than obtainable with a piston type valve.

It is another object of invention to provide a pilot valve which is automatically resetting.

It is another object of the invention to provide a pilot valve in which has means for indicating which valve was activated first when several such valves are connected together in a system.

In accordance with the invention there is provided a pilot valve which includes a bleed valve connected with a bourdon tube which senses a fluid pressure in response to which the pilot valve is operatable. The bourdon tube is connected with the bleed valve by a coupling assembly which activates the bleed valve in response to either predetermined high or low pressures sensed by the bourdon tube. An indicator is coupled with the bourdon tube to show whether the pilot valve operated in response to a high or low pressure. The bleed valve is connectable to fluid control systems such as safety valves for exhausting a controlled pressure to a safety valve to allow the safety valve to close in response to a change in a sensed pressure. The pilot valve has a second indicator which shows which of several such valves interconnected in a system operated first.

The foregoing objects and advantages and the structure of a preferred from of valve embodying the invention will be better understood from the following detailed description taken in conjunction with the drawings wherein.

2

Figure 1:
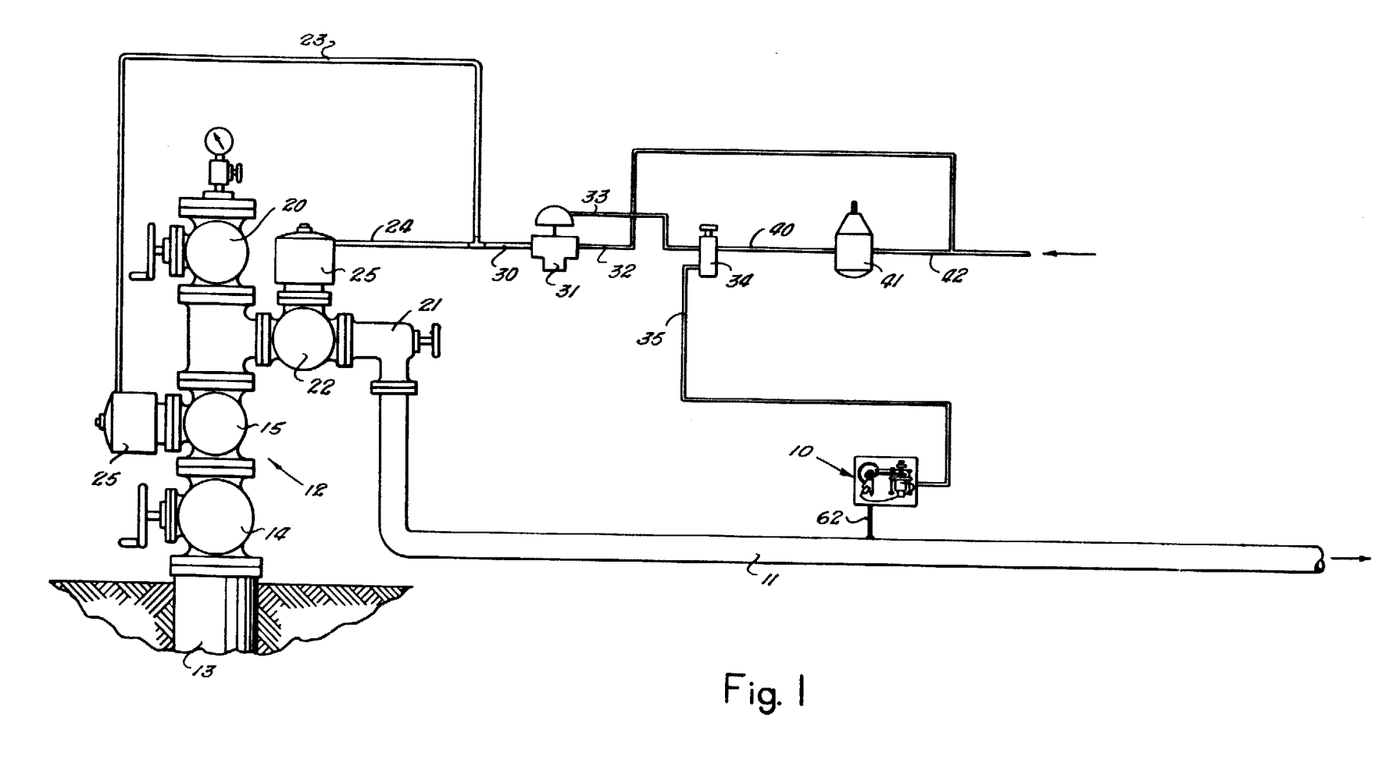
FIG. 1 is a schematic illustration of a well safety valve system connected with a pilot valve embodying the invention.

Referring to FIG. 1, a pilot valve 10 embodying the invention is connected to a flow line 11 extending from a Christmas tree 12 on a well casing 13. Included in the Christmas tree is a master valve 14, a safety valve 15, and a tubing access valve 20. The flow line 11 is connected into the Christmas tree through a choke 21 and a second safety valve 22. Both of the safety valves 15 and 22 may be each be an Otis type U pneumatic actuated gate valve as illustrated and described at pages 3520 and 3521 of the 1972-73 edition of the COMPOSITE CATALOG OF OIL FIELD EQUIPMENT AND SERVICES, published by World Oil Houston, Tx. The safety valves are normally closed valves held open by fluid pressure such as air or gas communicated through conduits 23 and 24 to the control cylinder 25 on each of the valves. The lines 23 and 24 are supplied with gas or air through a line 30 leading from a three way valve 31 at a pressure which generally may range from about 30 to 150 pounds per square inch. The valve 31 controls pressure fluid to the line 30 from a pressure source 32 in response to a control fluid pressure from the line 33 which is connected with a valve 34. The valve 34 is controlled by pressure in a line 35 leading to the pilot valve 10. The valve 34 controls communication to the line 33 from line 40 running from a pressure regulator 41 connected with a pressure supply line 42 which is also connected as illustrated with the line 32. The valves 31 and 34 and the regulator 41 are suitable standard units commonly used in such well safety and other forms of control systems.

In operation, the pilot valve 10 senses the pressure in the flow line 11 responding to either a high or a low pressure to exhaust the pressure in the line 35, which typically may be about 30 pounds per square inch. The valve 34 bleeds off the pressure in the line 33 causing the valve 31 to open to exhaust the pressure in the line 30 connected with the lines 23 and 24 leading to the control cylinder 25 on the safety valves 15 and 22. The pressure reduction in the cylinder 25 permits the safety valve to close shutting in the well. The indicator means on the pilot valve shows whether the pilot valve operated to shut in the well in response to a high or a low pressure. If several of the pilot valves 10 are interconnected on a well, one of the indicators on the pilot valves shows which of the pilot valves operated first.

Figure 2:
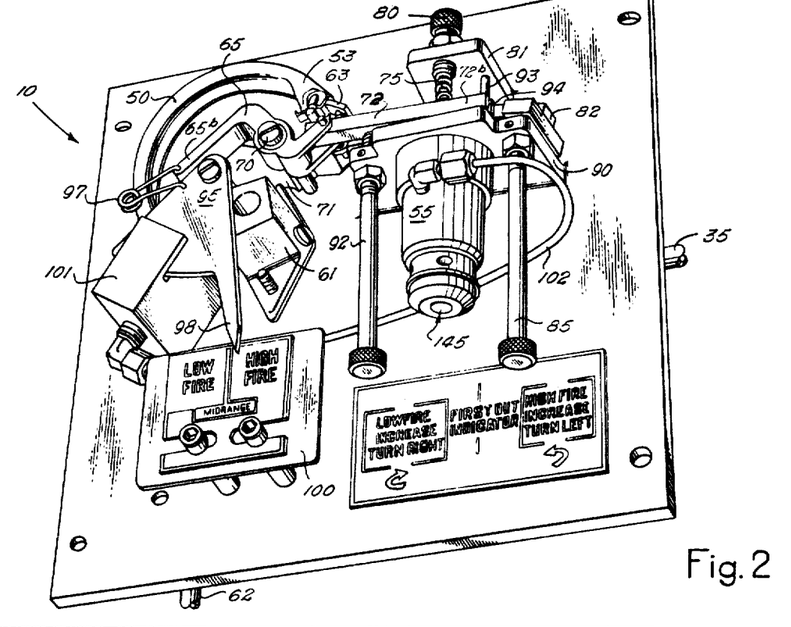
FIG. 2 is a perspective view of a commercial form of the pilot valve.
Figure 3:
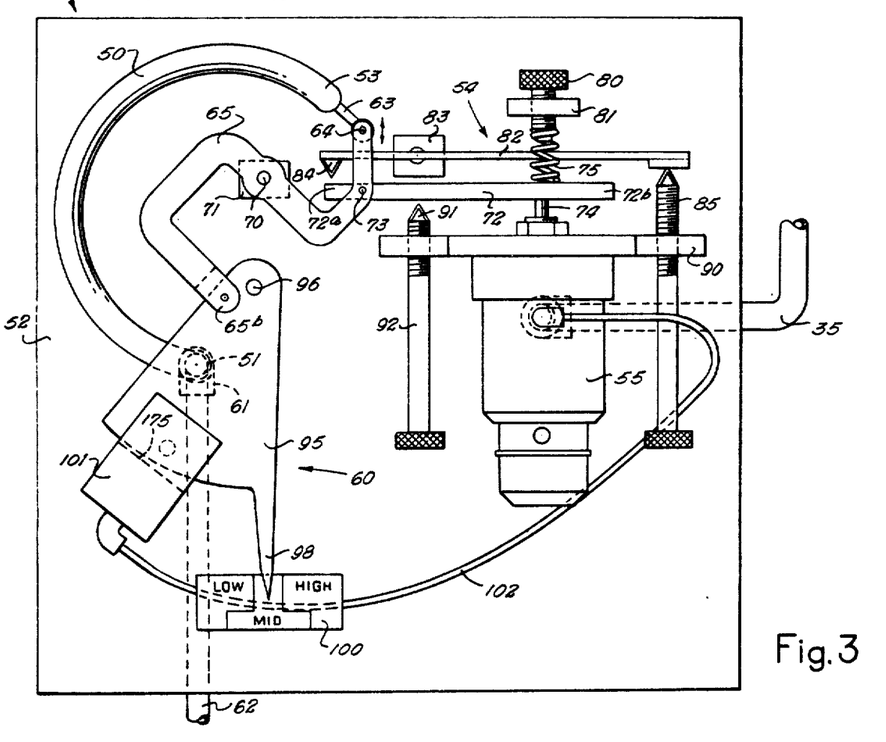
FIG. 3 is a schematic side view in elevation of the pilot valve shown in FIG. 2.
Figure 4:
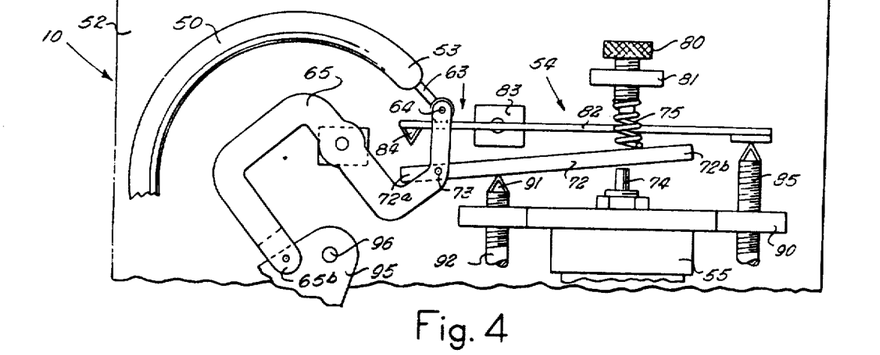
FIG. 4 is a fragmentary side view in elevation of the pilot valve of FIG. 3, showing the activation of the valve in response to a high pressure.
Figure 5:
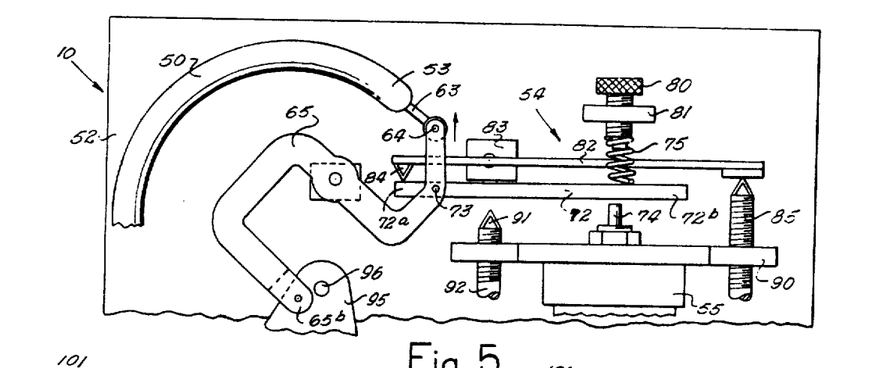
FIG. 5 is a fragmentary schematic view in elevation of the pilot valve activated in response to a low pressure.

FIG. 2 illustrates the actual structure of one commercially available form of the pilot valve 10, while FIGS. 3, 4 and 5 are schematic representations of the pilot valve with a few of the parts used in actual practice being eliminated for simplicity. The pilot valve 10 includes a bourdon tube 50 secured at a first end 51 with a mounting plate 52 and free at the opposite end 53 to move in response to pressure changes within the tube. The free end 53 of the bourdon tube is connected with a linkage assembly 54 which actuates a bleed valve 55. The free end of the bourdon tube is also connected with an indicator 60 which shows the pressure level at which the pilot valve 10 responded. The linkage 54 opens the bleed valve 55 in response to either a low pressure or a high pressure within the bourdon tube. The indicator 60 shows whether the valve system responded to a high, low, or mid pressure range, and locks the indicator at such pressure until the valve is reset.

The bourdon tube 50 is secured at the end 51 with a fitting 61 for supporting the bourdon tube from the mounting plate 52 and connecting the tube with a pressure line 62 leading to the flow line 11 for communicating the monitored pressure in the line 11 into the bourdon tube. The free end 53 of the bourdon tube is connected by a link 63 and a pivot pin 64 with one end of a serpentine shaped crank 65 which is pivotally secured on a pin 70 connected with a fitting 71 on the mounting plate 52. A flapper lever 72 is secured at a first end 72a by a pin 73 to the crank between the pivot pins 64 and 70 in the crank. The lever holds the bleed valve 55 closed at normal operating pressures and releases the valve to open at selected high and low flow line pressures. The bottom face of the flapper 72 near the opposite end 72b engages a valve pin 74 on bleed valve 55 while the top face of the flapper is engaged by the lower end of a spring 75 supported from an adjustment screw 80 threaded through a bracket 81 on the mounting plate 52. A high pressure adjustment arm 82 is pivotly secured to a bracket 83 on the mounting plate near a first arm end provided with a fulcrum point 84. the other end of the adjustment arm 82 is engageable on a bottom face with an adjustment screw 85 threaded through a mounting bracket 90 on the plate 52. The fulcrum point 84 is raised and lowered by the adjusting screw 85 for setting the desired high pressure at which the pilot valve is activated. A low pressure fulcrum point 91 is on the upper end of an adjustment screw 92 threaded through the bracket 90 to engage the lower face of the flapper 72 between the valve operator pin 74 and the pivot pin 73 connecting the flapper with crank 65. Raising and lowering the fulcrum point 91 by means of the adjustment screw 92 sets the low pressure at which the pilot valve is activated. A guide pin 93 extending downwardly from the bracket 81 engages a slot 94 in the flapper end 72b to keep the flapper aligned over the valve pin 74. When the pressure in the line 11 exceeds a normal value, the bourdon tube 50 expands or spreads raising the free end 53 lifting the end 72a of the flapper 72 until the top face of the end 72a of the flapper engages the fulcrum point 84. Further expansion of the bourdon tube causes the flapper 72 to be lifted upwardly pivoting about the fulcrum point 84 lifing the opposite end 72b of the flapper upwardly away from the valve pin 74 allowing the valve 55 to open. Similarly, a reduction in the pressure in the flow line 11 causes contraction of the bourdon tube so that the free end 53 moves downwardly lowering the flapper 72 until the lower face of the flapper engages the fulcrum point 91. Further contraction of the bourdon tube forces the end 72a of the flapper further downwardly pivoting the flapper counterclockwise on the fulcrum point 91 also lifting the end 72b of the flapper away from the valve pin 74 allowing the bleed valve 55 to open in response to a predetermine low pressure.

The crank 65 operates the indicator 60 simultaneously with the opening of the valve 55. The ends 65b of the crank is connected with a pointer 95 supported on a pivot pin 96 from the mounting plate 52 so that the crank and the pointer body rotate in the same directions as the bourdon tube expands and contracts in response to changes of pressure in the flow line 11. In the commercial form of the device shown in FIG. 1, the end 65b of the crank is coupled by a clutch spring 97 to the pointer providing a resilient coupling between the pointer body of the crank. An indicator tip 98 on the pointer swings across a scale 100 on the mounting plate. The scale is divided into low, mid, and high pressure ranges for showing the pressure at which the pilot valve is activated. The pointer swings through a lock assembly 101 connected by a pressure line 102 with the valve 55. The lock assembly is activated by the bleed valve 55 locking the pointer at a position indicating the pressure at which the pilot valve responded. The pointer is held at such position until the resetting of the pilot valve. The lock assembly is connected by pressure line 102 with the bleed valve 55.

Figure 6:
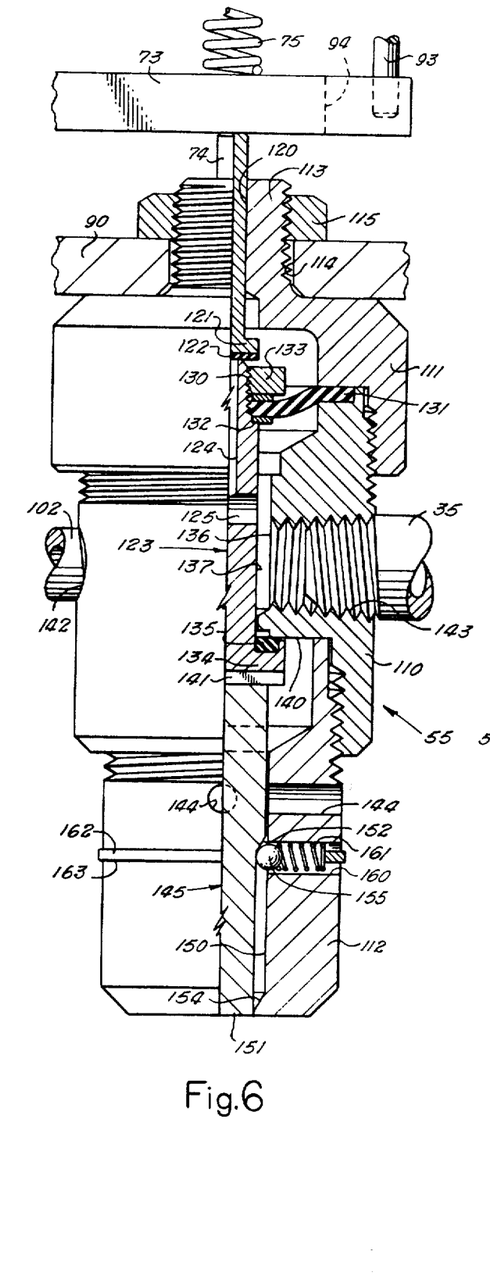
FIG. 6 is an enlarged side view in elevation and section of the bleed valve used in the pilot valve, showing the bleed valve closed.
Figure 7:
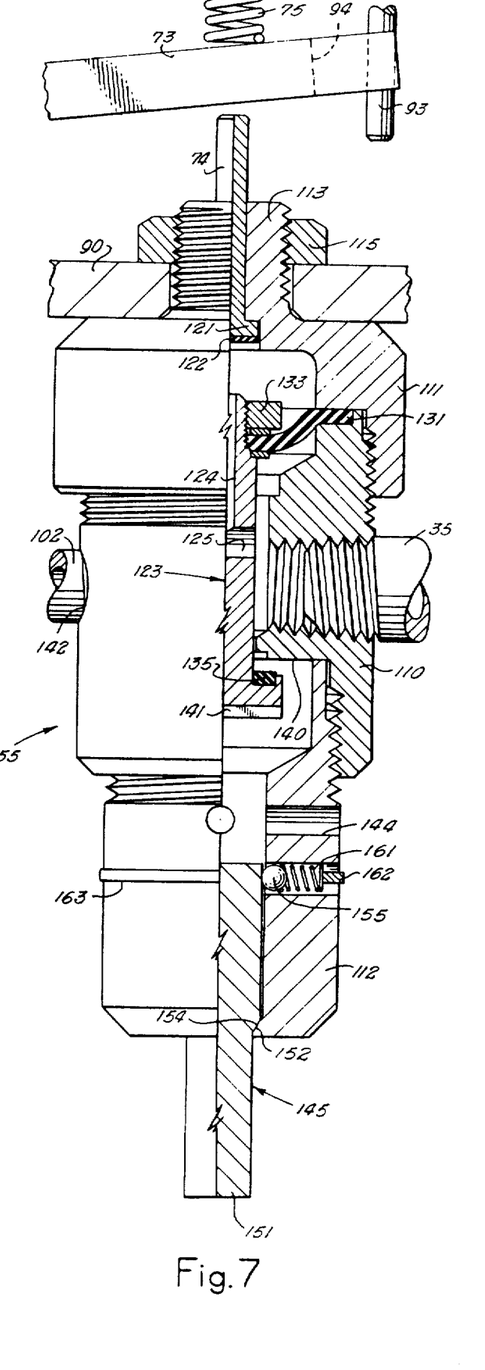
FIG. 7 is a side view in section and elevation of the bleed valve open.

The bleed valve 55 is shown closed in detail in FIG. 6 and open in FIG. 7. The valve has a body 110, a cap 111 threaded on the upper end of the body, and an indicator housing 112 threaded into the lower end of the body. The upper portion of thecap is reduced and and threaded externally at 113. The cap projects through an opening 114 in the bracket 90 and is held by a nut 115 securing the valve to the bracket. The bleed valve operaor pin 74 slides in the central bore 120 of the cap and is formed at a lower end integral with a valve member 121 faced with a circular gasket 122. The valve member 121 engages the upper end of a valve stem 123 having an upwardly opening central bore 124 communicating with a lateral port 125. When the operator pin 74 and valve 121 are in the lower position of FIG. 6, the gasket 122 covers the upper end of the central bore 124 through the valve stem 123. The valve stem 123 has a reduced externally threaded upper end portion 130 extending through an annular diaphram 131. The valve stem is clamped with the daiphram by identical washers 132 and a lock nut 133 threaded on the portion 130 of the stem for resiliently supporting the stem for longitudinal movement within the body of the bleed valve. The lower end of the stem 123 is enlarged to provide an annular valve member 134 which supports an annular ring seal 135 engageable with a downwardly facing annular valve seat surface 140 formed within the body 110. The bore 136 of the body 110 is larger than the valve stem defining an annular 137 around the stem. The lower end face of the stem 123 is provided with a lateral slot 141 for engagement of a wrench or screwdriver to hold the stem when assembling the bleed valve. The body 110 has a lateral port 142 for the connection of line 102 leading to the pointer lock assembly 101. A lateral internally threaded port 143 is in the body for the connection of the conduit 35 leading to the valve 34 as shown in FIG. 1. The effective area of the diaphram 131 exposed to pressure in the annular 137 is substantially greater than the area within the line of sealing of the seal 135 with the valve seat 140.

The lower housing 112 of the bleed valve 55 has a plurality of lateral ports 144 to exhaust pressure from the bleed valve when the valve is open as shown in FIG. 7. An indicator pin 145 is disposed for longitudinal movement in the bore 150 of the housing 112 for providing an easily seen indication that the pilot valve has operated. The indicator pin has a reduced lower end portion 151 defining a downwardly and inwardly sloping locking shoulder 152 about midpoint along the length of the pin. The upper end of the pin 145 is engageable with the lower end of the valve member 134 limiting the upward movement of the pin into the housing 112. The lower end of the bore 150 of the housing 112 has an internal annular locking shoulder 154 which engages the locking shoulder 152 on the pin 145 preventing the pin from dropping out of the housing when it is at a lower end position as in FIG. 7. A locking ball 155 in a lateral bore 160 below the side port 144 engages the shoulder 152 causing an upward force on the pin holding the stem 123 at an upper end position and the seal 135 on the seat 140. The ball is biased inwardly by a spring 161 retained by a lock ring 162 in an annular slot 163 around the housing 112.

Figure 8:
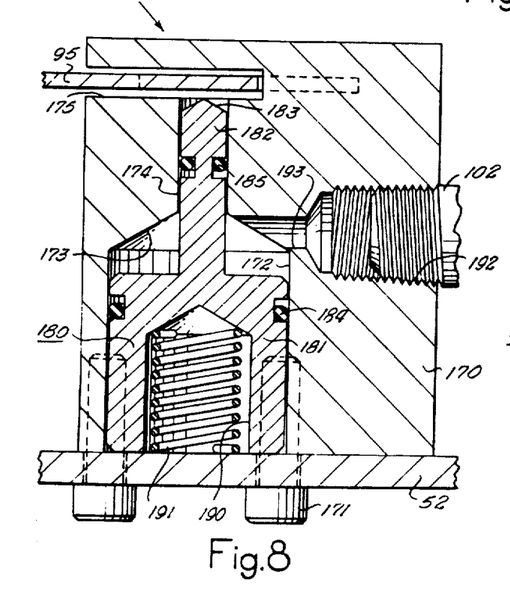
FIG. 8 is a view in section of the locking assembly of the pressure indicator of the pilot valve, showing the indicator unlocked.
Figure 9:
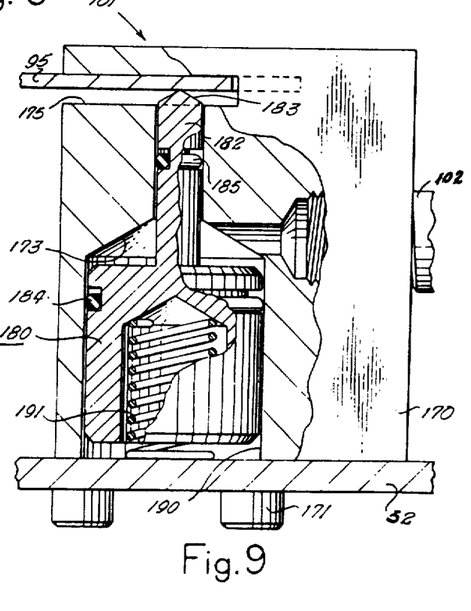
FIG. 9 is a fragmentary view in section and elevation of the locking assembly of FIG. 8 engaging the pointer of the indicator.

The indicator lock assembly 101 is shown in detail in FIGS. 8 and 9. The assembly includes a body 170 connected by a plurality of cap screws 171 to the mounting plate 52. The body has a first large cylindrical chamber 172 opening through the side of the body and provided with a cone shaped inward end 173 which opens into a reduced bore 174 communicating with a lateral locking slot 175 which is wider than the thickness of the pointer 95 so that the pointer may swing freely through the slot as evident in FIG. 3. A spring and pressure operated plunger 180 is disposed within the chamber portions 172 and 174 of the body for movement between the releasing and locking positions respectively shown in FIGS. 8 and 9. The plunger has a large tubular portion 181 which slides within the chamber portion 172 and a reduced portion 182 which slides within the chamber portion 174. The plunger portion 182 has a pointed locking tip 183 which is engageable with a side face of the pointer 92 to lock the pointer with the body as shown in FIG. 9. The plunger portion 181 has an external annular ring seal 184 for sealing around the plunger within the chamber portion 172 and the reduced portion 182 of the plunger has an external annular ring seal 185 for sealing around with the wall of bore 174. The plunger 180 has a spring chamber 190 in which a spring 191 is confined for biasing the plunger to the locking position of FIG. 9. The spring is held within the chamber 190 by the plate 52. The body 170 has a lateral port 192 opening into a flow passage 193 communicating with the chamber 172 to supply fluid pressure from the bleed valve 55 through the line 102 into the chamber 172 between the ring seals 184 and 185 on the plunger. It will be seen by reference to FIGS. 1 and 6 that the pressure in the line 35 controlled by the pilot valve 10 is the same pressure communicated through the line 102 to the plunger 180. This pressure in the chamber 172 holds the plunger 180 in the retracted position of FIG. 8 so that the pointer 92 freely swings through the slot 175. When the safety valve system reacts to either a high or low pressure in the line 11 bleeding off the pressure in line 35, the pressure is also bled from the chamber 172 so that the spring 191 may expand forcing the plunger locking tip 183 into slot 175 to engage the pointer 192 locking the pointer at a position indicating the pressure valve which actuated the pilot valve. The indicator lock assembly 101 is released from the pointer 92 only by restoration of the pressure in the chamber 172 to retract the plunger to the release position of FIG. 8.

The pilot valve 10 functions in the well system shown in FIG. 1 to shut-in the well by closing the safety valves 16 and 22 in response to either a low pressure or a high pressure of predetermined value within the flow line 11. The valve is set to protect the well in the event of excessively high or low pressure conditions which might be brought about by flow line damage, hydrates freezing in the flow line, a down-stream valve being closed inadvertedly, or other equipment failures or conditions which create dangerous situations. By reference to FIGS. 2 and 3 it will be recognized that pressure increases in the line 11 communicated through the line 62 to the bourdon tube 50 tend to spread or expand the tube. Adjustments in the pilot valve which determine the high pressure at which the valve responds are made by the screw 85 which raises and lowers the fulcrum point 84. Similarly, a decrease in the pressure in the line 11 is communicated to the bourdon tube which tends to contract lowering the flapper lever 73. Adjustments in the low pressure to which the system responds are made by the set screw 92 which raises and lowers the fulcrum point 91. With the pilot valve properly adjusted and normal pressure within the line 11, the components of the valve are positioned as illustrated in FIG. 3. The flapper lever 72 is aligned with the end 72a at a neutral position between but not contacting the fulcrum points 84 and 91. The other lever end 72b is held downwardly by the spring 75 against the bleed valve control pin 74 holding the bleed valve 55 closed as shown in FIG. 5. The pressure in the line 35 communicated into the bleed valve is confined around the valve stem 123 in the annulus 137 and within the valve stem by the seals 122 and 135. The upwardly acting pressure on the bottom face of the diaphram 131 holds the valve stem at an upper end position at which the valve 134 seals with the seat 140.

If the pressure in the line 11 exceeds the predetermined value for which the pilot valve is set, the bourdon tube expands or spreads raising the end 53 and the link 63. The upward movement of the free end of the bourdon tube lifts the flapper lever 72 and similtaneously rotates the crank 65 in a counterclockwise direction. The lever end and 72a is raised until the top surface of the lever engages the fulcrum point 84 causing further lifting of the lever 72 to pivot the lever upwardly counterclockwise about the fulcrum point 84. The other end 72b of the lever is thereby raised against the spring 75 to the position shown in FIG. 5 at which the lever disengages from and releases the bleed valve operator pin 74 as represented in FIGS. 5 and 7. The pressure within the bleed valve from the line 35 acting upwardly within the bore 124 of the valve stem against the bottom face of the seal 122 forces valve 121 with the integral pin 174 upwardly to the position of FIG. 7. The upper end of the bore 124 is uncovered so that the pressure within the bore is communicated into the cap 111 above the diaphram 121 equalizing the pressures on the opposite sides of the diaphram. The downward pressure in the annulus 137 over the area defined by the seal 135 with the valve seat 140 develops sufficient downward force on the valve stem to move the valve stem downwardly to the position of FIG. 7 at which the bledd valve is open. The pressure from the line 35 within the bleed valve is now exhausted downwardly around the valve stem, past the seal 135 between the seal and the valve seat 140, through the bore of the housing member 112, outwardly to the atmosphere through the ports 144 so that the pressure within the line 35 is reduced to atmospheric. The release of the pressure in the line 35 acting through the valves 34 and 31 relieves the pressure in the cylinders 25 of the two safety valves 15 and 22 thereby permitting the safety valve to close.

When the valve stem 123 of the bleed valve 55 is forced downwardly to the position of FIG. 7, the downward movement of the valve stem against the upper end of the indicator pin 145 releases the pin and moves it downwardly. The annular shoulder 152 on the indicator pin cams the locking ball 155 outwardly against the spring 161 releasing the indicator pin to drop to the position shown in FIG. 7. The exposed lower end of the indicator pin provides quick visual evidence that the pilot valve has functioned in response to a pressure change in line 11 for closing the safety valves 15 and 22 on the well. The indicator pin 145 is especially helpful in situations where several of the pilot valves 10 are connected together in a well system. In such a situation, it is desirable to know which of the several pilot valves functioned. While the pointer 95 of each of the pilot valves will move to the pressure range at which the pilot valve acted, only the bleed valve 55 in the pilot valve which responds first will actually open to bleed down the system. Thus, the pressure indicator on all interconnected pilot valves will lock at a reading of the flow line pressure which caused pilot valve operation, the bleed valve on only one of the pilot valves will open and this indicator pin 145 on that pilot valve will be extended to identify it.

At the time that the bleed valve 55 opens in response to a pressure change in the line 11, the pressure within the line 102 connected with the bleed valve is also exhausted to the atmosphere through the ports 144. The release of the pressure in the line 102 drops the pressure within the lock assembly 101 in the chamber 172 between the seals 184 and 185. As soon as this pressure is lowered below a value sufficient to resist the force of the spring 191, the spring expands moving the plunger to the position of FIG. 9 at which the locking point 183 on the plunger engages and captures the pointer 92 within the slot 175. The locking point 183 locks the pointer at the position to which it was moved by the bourdon tube in response to the pressure in the flow line 11. In the example just described in which the pilot valve responded to a high pressure, the pointer is moved to the high pressure range on the scale 100 at which it is locked until the resetting of the trottle valve.

When the pressure within the flow line 11 decreases below a predetermined low value for which the pilot valve 10 is set, the reduced pressure within the bourdon tube 50 permits the tube to contract so that the free end 53 moves downwardly to the position illustrated in FIG. 4. When the bottom face of the flapper lever 72 engages the fulcrum point 91, further downward movement of the bourdon tube end lowers the lever end 72a pivoting the lever 72 counterclockwise about the fulcrum point 91 lifting the end 72b of the lever to release the bleed valve operator pin 74 permitting the bleed valve 55 to again open as in FIG. 7. The position of the linkage system parts of the pilot valve after response to a predetermined low pressure are shown in FIG. 4. The lowering of the free end of the bourdon tube rotates the crank 65 clockwise causing the pointer 95 to pivot clockwise on the pin 96 moving the pointer into the low range on the scale 100 at which the assembly 101 locks the pointer. The bleed valve 55 is shown in FIG. 7 exhausting the pressure in the line 35 in the same manner as described in connection with the high pressure operation of the pilot valve.

The pilot valve 10 automatically resets upon the reestablishment of a normal pressure in the line 11. The pressure transmitted into the bourdon tube causes the tube to return to the neutral position represented in FIG. 3 between the fulcrum points 84 and 91 so that the flapper lever 72 is released allowing the spring 75 to return the end portion 72b of the lever back downwardly to the position shown in FIGS. 3 and 6. When the lever 72 moves downwardly, the operator pin 74 is forced downwardly until the seal 122 on the valve 121 engages the upper end of the bleed valve stem 123 so that no flow may occur upwardly through the bore 124 of the valve stem. The normal operating pressure is restored in the line 35 by resetting such other valves as necessary within the well system. With such pressure restored a pressure differential is restored across the diaphram 131 increasing the pressure below the diaphram lifting the diaphram and the valve stem 123 back upwardly to close the bleed valve 55 as shown in FIG. 6. The indicator pin 145 is manually returned upwardly until the locking ball 155 snaps inwardly to engage the locking shoulder 152 for releasably holding the pin retracted.

At the time that the pressure is restored in the line 35, such pressure is communicated in the annular 137 of the bleed valve into the line 102. Such pressure is supplied through the lateral port 193 into the chamber 172 of the lock assembly 101. The pressure acting on the plunger 180 over an area equal to the difference in the lines of sealing of the ring seals 184 and 185 applies a force to the plunger biasing the plunger outwardly against the spring 191 retracting the plunger locking point 183 from the slot 175. The pointer 92 is freed for movement in the slot allowing the pointer to return to the normal mid-pressure area illustrated in FIG. 3. Any lag which may occur between the restorations of the pressures in the bourdon tube 50 and within the lock assembly will be compensated for by the spring 97 which transmits the motion of the crank 65 to the pointer 95. This permits the bourdon tube to return lever 73 to a neutral position even if the plunger 180 has not retracted to release the pointer. Should such a delay occur, the bleed valve 55 may start the process of resetting with the pointer being reset as soon as full normal pressure is restored in the line 35.

It will now be seen that a new and improved pilot valve has been described and illustrated. The valve senses pneumatic or hydraulic pressures activating a pressure release or bleed valve to operate a safety valve within another system such as a well flowing oil or gas. The pilot valve includes visual indicators to show the activation pressure level, whether high or low, and also has an indicator to show which of several such valves connected together reacted first. The pilot valve is responsive to both preset high and low pressures. The valve in commercial practice has accuracies superior to piston type sensors and has a repeatability characteristic of one percent or less with a dead band range of only 1½ to 2 prcent. The pilot valve automatically resets upon restoration of the operating pressure connected with the valve.

What is claimed is:

1. A pilot valve system for controlling a first fluid pressure in response to predetermined high and low values of a second fluid pressure comprising: a bourdon tube fixed at and connectible with said second fluid pressure at a first end and free at a second end to move in response to changes in said second fluid pressure within said tube; a bleed valve connectible with said first fluid pressure to exhaust said pressure; bleed valve operator means connected between said second end of said bourdon tube and said bleed valve for opening said bleed valve responsive to one of both a high and a low value of said second fluid pressure, said operator means being functional at both of said pressure values for each of a plurality of adjustments of said values.

2. A pilot valve in accordance with claim 1 including pressure indicating means connected with said bourdon tube and pressure coupled with said bleed valve for operating said pressure indicating means in response to the opening of said bleed valve, said indicating means being adapted to releasably lock at the pressure value at which said bleed valve is opened for retaining an indication of such value on said indicating means until said pilot valve system is reset.

3. A pilot valve according to claim 1 wherein said valve operator mmeans includes a flapper lever pivotally connected at a first end with said second end of said bourdon tube, said lever being engageable at a second end with said bleed valve for opening and closing said bleed valve responsive to movement of said second end of said bourdon tube, and fixed spaced fulcrum points engageable by said lever for pivoting said lever to move said second end of said lever to operate said bleed valve when said second end of said bourdong tube is moved responsive to a change to one of both and a high low value of said second fluid pressure.

4. A pilot valve in accordance with claim 3 including indicating means for showing the pressure at which said bleed valve is activated, said indicating means being releasably lockable in response to the operation of said bleed valve to provide an indication of the pressure valve at which said bleed valve operated, said indication being retained by said indicating means until said pilot valve system is reset for a subsequent operational sequence.

5. A pilot valve in accordance with claim 3 wherein said lever is pivotally supported at said first end between two fulcrum points spaced along and positioned on opposite sides of said lever to cause the movement of the end of said lever in a single direction in response to movement of said second end of said bourdon tube in either of two directions.

6. A pilot valve in accordance with claim 5 wherein said fulcrum points are positioned to effect movement of said second end of said flapper lever away from said bleed valve responsive to movement of said second end of said bourdon tube in either of said two directions.

7. A pilot valve in accordance with claim 6 wherein said bleed valve includes an operator pin engageable by said flapper lever when said lever is in a neutral position for holding said bleed valve closed and releaseable by said flapper lever when said lever moves in a direction of said valve for allowing said bleed valve to open.

8. A pilot valve in accordance with claim 3 wherein said indicating means includes a crank arm connected with said second end of said bourdon tube, a pointer connected with said crank arm, and a fluid actuated locking assembly operable with said pointer and with said bleed valve for locking said pointer at a position indicating a pressure range at which said pilot valve responded to said second fluid pressure.

9. A pilot valve for controlling a first fluid pressure in response to predetermined high and low values of a second fluid pressure comprising: a bourdon tube fixed at a first end and connectible at said end with said second fluid pressure; a second end of said bourdon tube being free to move in response to changes in the value of said second fluid pressure; bleed valve means adapted to be connected with said first fluid pressure for containing said pressure when closed and for exhausting said pressure to activate a fluid system communicated with said pressure when said bleed alve means is open; lever assembly means connected between said bourdon tube free end and said bleed valve means for opening said bleed valve means responsive to movement of said free end of said bourdon tube in both of two directions for opening said bleed valve means when said second fluid pressure in said bourdon tube reaches one of high and a low predetermined value; and indicator means connected with said free end of said bourdon tube and said bleed valve to provide a showing of the pressure at which said bleed valve opened and to lock said indicator means at said opening pressure until said pilot valve is reset.

10. A pilot valve in accordance with claim 9 wherein said bleed valve is provided with means for indicating when said valve has been opened, said means operating independently of said indicator means.

11. A pilot valve system for controling a first fluid pressure in response to either of predetermined high or low values of a second fluid pressure comprising: a bourdon tube fixed at a first end and free to move at a second end; means connected with said first end of said bourdon tube for communicating said tube with said second fluid pressure; a bleed valve adapted to be communicated with said first fluid pressure for containing such pressure when said bleed valve is closed and for exhausting said pressure when said bleed valve is open, said bleed valve having an operator pin connected with a valve element, said operator pin being adapted to be held at a first position for holding said bleed valve closed and to be released for a movement to a second position at which said bleed valve is open; a flapper lever pivotally secured at a first end with said second end of said bourdon tube and adapted at a second end to engage said operator pin of said bleed valve to hold said bleed valve closed when said lever is at a neutral position; a spring engageable with said second end of said lever biasing said second end toward said bleed valve operator pin to hold said pin at a position to keep said valve closed; a first adjustable fulcrum point supported for engagement with said first end of said flapper lever on a side of said lever to pivot to move said second end of said lever away from said bleed valve operator pin when said free end of said bourdon tube moves in a direction away from said lever responsive to a predetermined high pressure in said tube; a second adjustable fulcrum point spaced from said first fulcrum point on the opposite side of said lever and engageable with said lever when said free end of said bourdon tube moves toward said lever responsive to a predetermined low pressure in said bourdon tube to move said second end of said flapper lever away from said valve operator pin; a crank pivotally secured at a first end with said second end of said bourdon tube and mounted for rotation responsive to movement of said end of said bourdon tube; a moveable indicator connected with a second end of said crank for arcuate movement responsive to rotation of said crank by said free end of said bourdon tube to provide a visual showing of the pressure within said bourdon tube causing movement of said free end of said bourdon tube whereby an indication is provided of the pressure at which said bleed valve is opened by said bourdon tube; and locking means pressure connected with said bleed valve and operatively associated with said indicator for locking said indicator at a position to show the pressure at which said bleed blave opened.

12. A pilot valve in accordance with claim 11 wherein said locking means of said pointer comprises a locking plunger having a piston portion biased toward a locking position by a spring and in a nonlocking position by said first pressure communicated from said bleed valve.

* * * * *